Feb. 13, 1934.

W. BARCLAY

Re. 19,078

AUTOMOBILE BODY

Original Filed May 29, 1929 3 Sheets-Sheet 1

INVENTOR
Wright Barclay
BY
James Harrison Bowen
ATTORNEY

Feb. 13, 1934.

W. BARCLAY

Re. 19,078

AUTOMOBILE BODY

Original Filed May 29, 1929 3 Sheets-Sheet 2

INVENTOR
Wright Barclay
BY
James Harrison Bowen
ATTORNEY

Feb. 13, 1934.

W. BARCLAY

Re. 19,078

AUTOMOBILE BODY

Original Filed May 29, 1929 3 Sheets-Sheet 3

INVENTOR
Wright Barclay
BY
James Harrison Bowen
ATTORNEY

Reissued Feb. 13, 1934 Re. 19,078

UNITED STATES PATENT OFFICE 19,078

AUTOMOBILE BODY

Wright Barclay, New York, N. Y.

Original No. 1,835,840, dated December 8, 1931, Serial No. 366,997, May 29, 1929. Application for reissue August 30, 1933. Serial No. 687,531

4 Claims. (Cl. 296—65)

This invention relates to automobile bodies.

The primary object of this invention is to provide an automobile body with a removable seat capable of easy manipulation when rolling the same into and out of position therein with an occupant seated therein. This type of body will be found most useful for invalids, as it is unnecessary to lift the helpless person from the auto seat to a roll chair, as is the usual practice, as the removable seat of the body is on wheels and may be rolled into and out of the body, and may be used separate from the body as a wheel seat when desired.

Another object of the invention resides in an automatic means for guiding a roll seat into its allotted space in an automobile body and for locking the same against rolling movement when in such parked position, and manually operable means within easy reach of an operator standing exteriorly of the body for releasing the locking means.

Another object of the invention is the provision of a roll seat having a fifth wheel movable into and out of contact with the ground when desired to enable the chair to be turned in a minimum amount of space, which is essential when manipulating the chair into and out of its position in the body of an automobile.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 1:
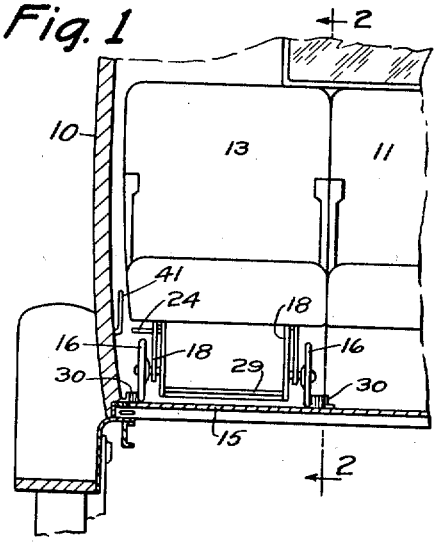
Figure 1 is a fragmentary vertical transverse sectional view through my improved auto body showing the removable seat in position therein.
Figure 2:
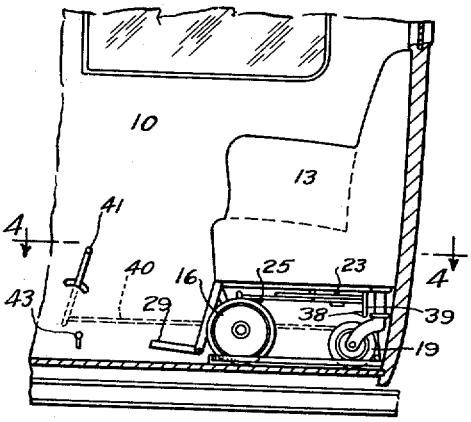
Figure 2 is a vertical longitudinal section view on the line 2—2 of Figure 1.

Referring to the drawings by reference characters, the numeral 10 designates a portion of an automobile body having a fixed passenger seat 11 which terminates in spaced relation to one of the sides of the body to provide a parking space 12 for a removable seat 13. The body is provided with a swingable door 14 and slidably mounted beneath the floor 15 of the body in alignment with the side door or doors is a ramp 16′ fully shown and described in my prior Patent No. 1,717,303, granted June 11, 1929. It is not believed necessary to go into detail as to the construction and operation of the ramp, other than to mention that the same may be withdrawn from its horizontal position beneath the floor and swung to permit one end to rest upon the ground at which time the ramp is at an incline bridging the ground and the floor of the auto body to allow the removable chair to be rolled thereover in a manner to be hereinafter explained.

The removable seat 13 may be constructed of a design and material as to be in keeping with the interior of the auto body and is mounted upon fixed rotatable front wheels 16 mounted on a transverse shaft 17, which shaft is supported by brackets 18 depending from the underside of the seat. A pair of swivel wheels 19 are provided at the rear of the seat to permit easy swinging of the rear of the chair during rolling of the same.

Figure 6:
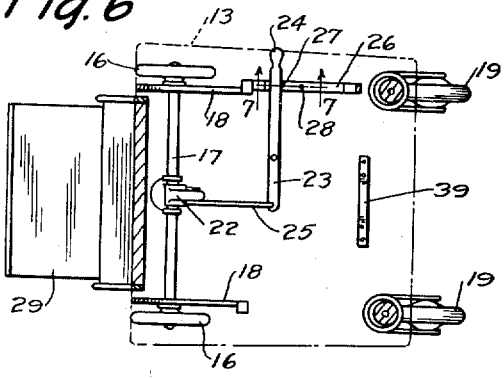
Figure 6 is a detail horizontal sectional view on the line 6—6 of Figure 3.
Figure 4:
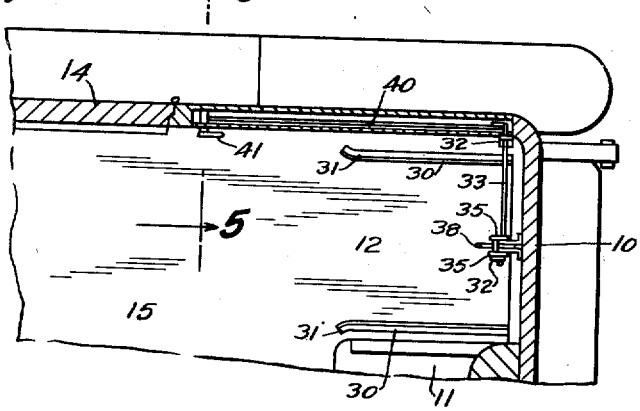
Figure 4 is a horizontal sectional view on the line 4—4 of Figure 2.
Figure 5:
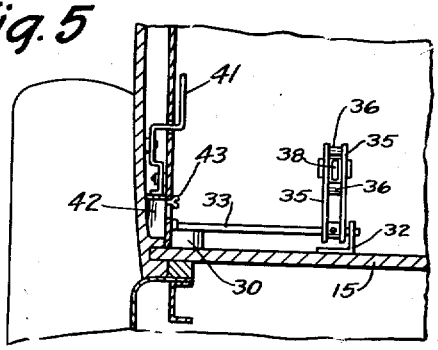
Figure 5 is a detail vertical sectional view on the line 5—5 of Figure 4.
Figure 7:
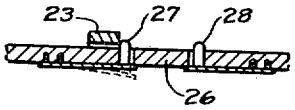
Figure 7 is an enlarged detail vertical sectional view on the line 7—7 of Figure 6.
Figure 8:
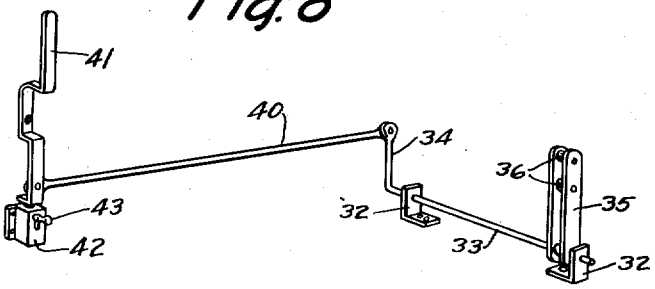
Figure 8 is a detail perspective view of the chair lock actuating mechanism.
Figure 9:
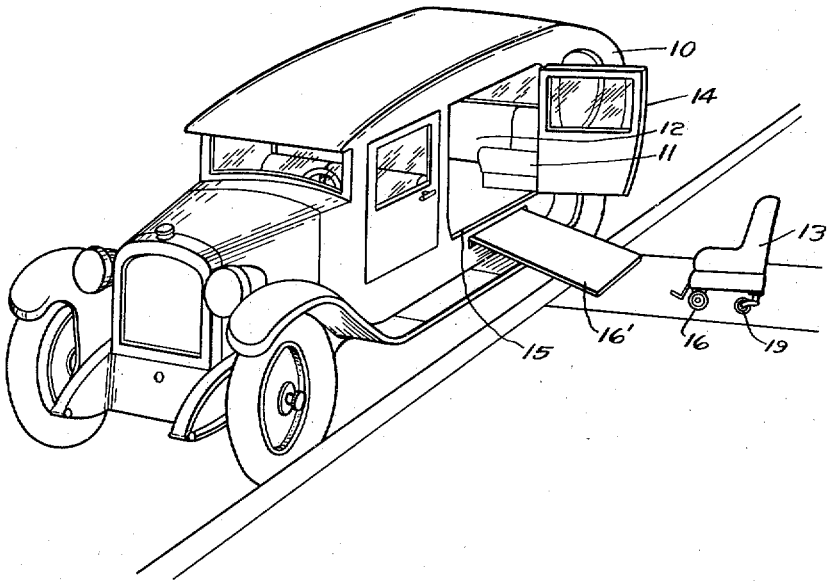
Figure 9 is a view showing a special automobile in which this device may be used, and showing the door open with the ramp in position and a wheel chair about to be rolled into the door.

For facilitating manipulation of the chair in a minimum amount of space, I provide an auxiliary wheel 20 which when in a lowered position contacts with the ground and jacks the front wheels 16 off the ground so that only the wheels 19 and 20 support the chair. The wheel 20 is of a type similar to the wheels 19 and the same is journalled in a weighted bracket 21, swivelly mounted in an arm 22 pivoted on the shaft 17. To swing the auxiliary wheel 20 to an inoperative position as shown in dotted lines in Figure 3 and for supporting the same in such position, I pivot a horizontal lever 23 to the underside of the seat, the manipulating end 24 of which terminates at the outer side of the seat as best seen in Figures 1 and 6. The inner end of the lever 23 is connected to the arm 22 by a link 25. A hanger bracket 26 is attached to the underside of the seat through which the outer end of the lever 23 extends and which bracket carries spaced resiliently mounted pins 27 and 28.

When the lever is moved to a position to engage the pin 27, the same is locked against movement with the auxiliary wheel in operative or lowered position, whereas when moved past the pin 28 to engage the same, the said pin acts as a stop for preventing the weighted fifth wheel from dropping to the ground. The resiliently mounted pins, being located near the manipulating handle 24, may be easily actuated before the handle and with the same hand of an operator that operates the said handle.

For the convenience of an occupant, the roll seat may be provided with a foot rest 29 and other accessories may also be embodied in the chair as would adapt the same for the same comforts as a conventional invalid roll chair which are not capable of being received in the back of the present automobile bodies.

Parallel guide rails 30 are fixed to the floor in the parking space 12 and have their outer ends flared or curved outward as at 31. When the seat is approximately aligned with the parking space 12 and rolled backward, the guide rails 30 effect a true backward movement of the seat which is essential for the actuation of the seat locking means now to be described.

Journalled in angle brackets 32 fixed to the floor at the rear of the space 12 is a transverse rock shaft 33 having a right angularly bent arm 34. Fixed to the shaft 33 is a pair of spaced plates 35 having spaced rollers 36 journalled therebetween. Pivoted to the rear wall of the body centrally of the space 12 is a latch 37 which extends between the spaced rollers 36. The hooked end 38 of the latch is in the path of a keeper 39 carried by the underside of the seat so as to engage the latch when the seat is in parked position. To actuate the catch or latch 37 to release the keeper, I provide a link 40, one end of which is pivotally connected to the arm 34 of the shaft 33, while the other end is pivoted to one side of the axis of an actuating lever 41. The lever 41 is located near the door 14 for access through the open door. To hold the latch 37 in a raised position to receive its coacting keeper, I lock the lever 41 in a vertical position by a finger actuated latch 42, the sliding bolt of which engages the lever which is released therefrom upon downward movement of a manipulating finger piece 43. By releasing the lever 41 by actuating the latch 42, and then swinging the lever rearward, the rollers 36 will force the pivoted latch 37 downward in locked engagement with its keeper 39, thus the seat is securely locked against such shocks as it may be subjected during ordinary travel of an automobile over a roadway. To unlatch the seat, the lever 41 is moved to the position shown in Figure 3 of the drawings, whereupon the latch is lifted free of the plane of its keeper and the seat may be rolled forward. The plates 35 and their rollers 36 form an actuator for the latch 37.

From the novel features herein shown and described, it will be seen that an invalid may be comfortably accommodated in the seat 13, and the said chair with the occupant remaining therein may be so manipulated as to be rolled down an inclined ramp onto a pavement or ground, and when reaching the ground, the seat may serve the purpose of a roll seat, thus making it unnecessary to transfer the occupant.

While I have described what I deem to be the most desirable embodiment of my invention, it is obvious that many of the details may be changed without in any way departing from the spirit of my invention, and I therefore do not limit myself to the exact details of construction herein set forth nor to anything less than the whole of my invention limited only by the appended claims. One of the changes may be in the use of a chair or seat of any other type or description, another may be in the use of wheels or rollers of any other type or arranged on the seat in any other manner, another may be in the use of other means for locking the seat in the body, and still another may be in the use of a ramp of any other type or description or of other means for holding the ramp.

Figure 3:
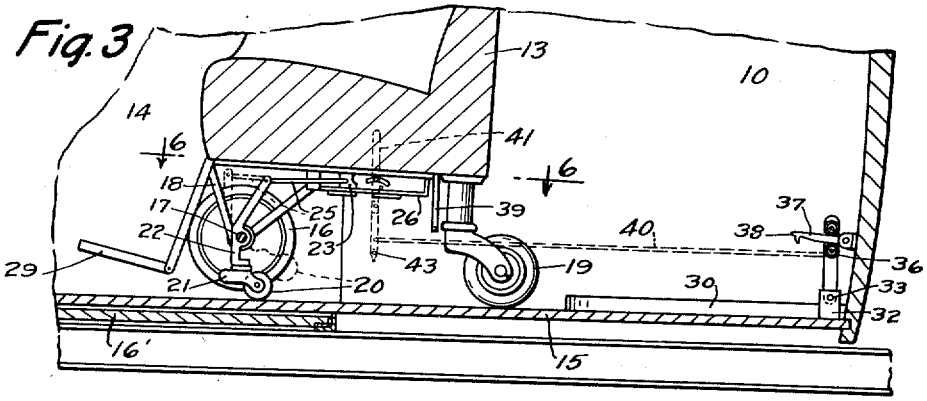
Figure 3 is a view similar to Figure 2 but showing the removable chair rolled out of its parking space and with the fifth wheel in contact with the ground.

The construction will be readily understood from the foregoing description. In use an invalid may remain in the seat and the seat with the invalid therein may be rolled to a point beside the vehicle, the ramp may be positioned with a slight incline leading up to the door of the vehicle, and the seat rolled up the ramp into the vehicle, and positioned at any point therein. The seat may then be locked in any position and when it is desired to remove the seat it may be unlocked and the ramp again positioned so that the seat may be rolled from the body. When not in use the ramp may be removed from this position and carried in a slot under the car body, as shown in Figure 3, or held at any point upon the body, as may be desired.

The seat has been shown and described as located in a space 12, however, it may be on either side of the car, or may replace one of the front seats, or positioned between the seats. The rails and holding means may also be omitted and the seat held in any manner.

Having thus fully described the invention, what I claim as new and desire to secure by Letters Patent, is:

1. In an automobile comprising a body and having a removable wheeled seat, which latter is provided with a keeper, means for releasably retaining the wheeled seat in a fixed position during travel of the automobile, said means including a pivotally movable latch for engaging said keeper, bearings rigid with said body and having a rod turnable therein, an arm carried by said rod, an actuator for said latch rigid with said rod, an operating lever pivotally mounted on said body, and link means pivotally connecting said arm and said lever, whereby on operating the latter said actuator is effective to move said latch for releasing the wheeled seat.

2. In an automobile, a body having a removable wheeled seat adapted to be rolled into and out of said body by means of a ramp adjustably connected to the body, a keeper mounted on said wheeled seat, and releasable holding means cooperating with said keeper to retain the wheeled seat in fixed position in said body during travel of the automobile, said releasable holding means including a pivoted latch mounted on the body for engaging said keeper, bearings mounted on the body, a rod rotatably mounted in the bearings, an arm carried by said rod, an actuator for said latch fixed on said rod, an operating lever pivotally mounted on said body, and link means pivotally connecting said arm and said lever, whereby operation of said lever moves said actuator to operate the lever and release the wheeled seat.

3. The combination with an automobile body having a transverse seat space disposed across the rear end of the body and extending from wall to wall thereof and having a permanent seat occupying one side portion of said seat space and leaving an opposite open side portion in said seat space, a removable roller chair for occupying said opening in the transverse seat space and adapted with the permanent seat to fill said space, a door in the side of the automobile body of a width sufficient to admit free passage therethrough of the roller chair from and to said transverse seat space and over a ramp carried by the automobile body in register with the door.

4. The combination with an automobile body having a transverse seat space disposed across the body and extending from wall to wall thereof and having a permanent seat occupying one side portion of said seat space and leaving an opposite open side portion in said seat space, a removable roller chair for occupying said opening in the transverse seat space and adapted with the permanent seat to fill said space, a door in the automobile body of a width sufficient to admit free passage therethrough of the roller chair from and to said transverse seat space and over a ramp carried by the automobile body in register with the door.

WRIGHT BARCLAY.